Jan. 21, 1947.    L. G. TUBBS    2,414,569
CONTROL DEVICE
Filed June 29, 1944
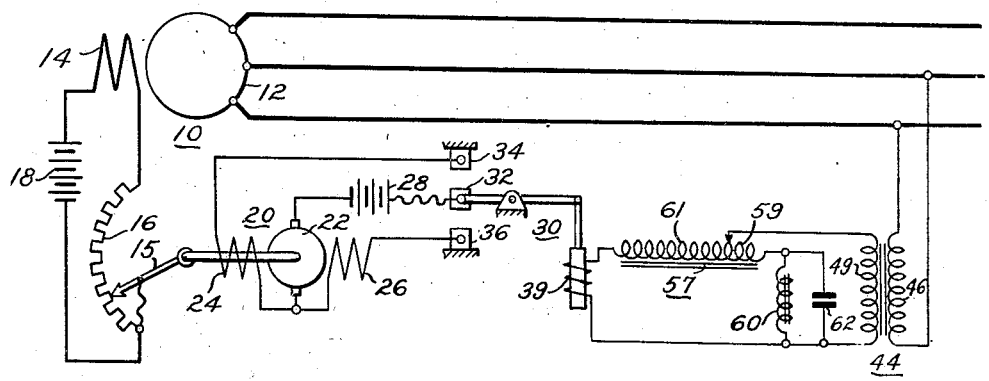
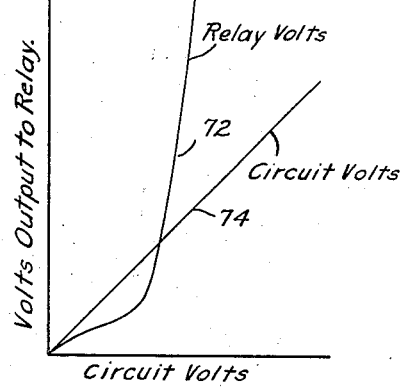
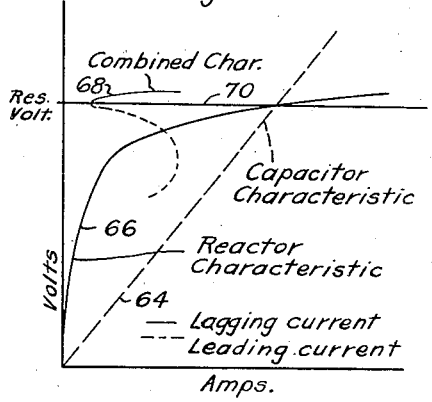
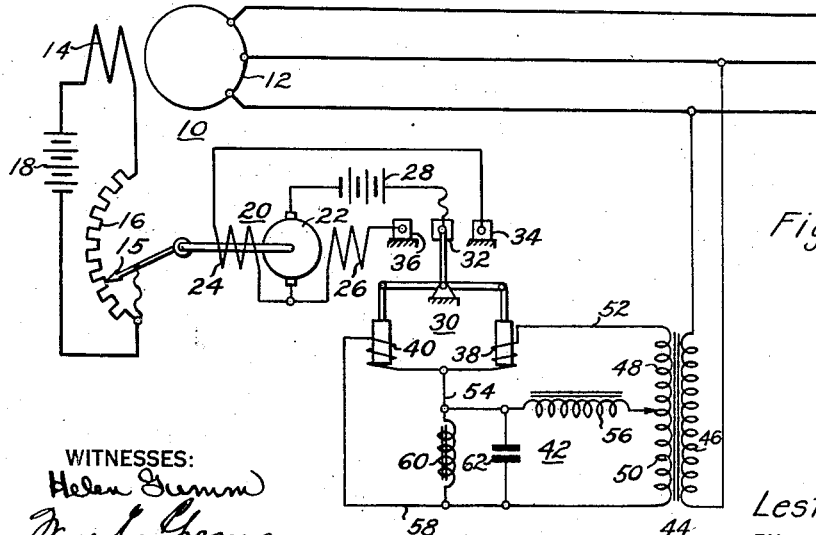
WITNESSES:
Helen Grimm
Wm. C. Groome
INVENTOR
Lester G. Tubbs.
BY
James K. Ely
ATTORNEY Patented Jan. 21, 1947

2,414,569

UNITED STATES PATENT OFFICE 2,414,569

CONTROL DEVICE

Lester G. Tubbs, Wilkinsburg, Pa., assignor to Westinghouse Electric Corporation, East Pittsburgh, Pa., a corporation of Pennsylvania Application June 29, 1944, Serial No. 542,732

4 Claims. (Cl. 171—312)

This invention relates to regulating systems, and in particular to static regulating systems.

An object of this invention is to provide a new and improved regulating system of the static type.

Another object of this invention is to provide a static regulating system which is sensitive to slight changes in voltage.

A more specific object of this invention is to provide a static regulating system for operating a relay in response to the rate of change of voltage which is to be regulated whereby the system is fast responding and sensitive to such changes in voltage.

Other objects of this invention will become apparent from the following description when taken in conjunction with the accompanying drawing, in which:

Figure 1 is a diagrammatic representation of apparatus and circuits illustrating an embodiment of this invention, Fig. 2 is a diagrammatic representation of apparatus and circuits illustrating another embodiment of this invention, Fig. 3 is a graph, the curves of which represent the response of the relay of Fig. 1 to a change in the voltage which is to be regulated, and Fig. 4 is a graph, the curves of which illustrate the characteristics of elements of the circuits of Figs. 1 and 2.

Referring to the drawing, and in particular to Fig. 2 thereof, there is illustrated an embodiment of this invention as applied to a three-phase dynamo-electric machine 10 having an armature winding 12 and a field winding 14. The excitation of the field winding 14 is controlled by adjusting the setting of a variable rheostat 16 which is connected in series circuit with the battery 18 and the field winding 14.

In the embodiment illustrated, the rheostat 16 may be adjusted by operation of the motor 20, the armature 22 of which is mechanically connected to operate the movable contact member 15 of the rheostat. The motor 20 is provided with two field windings 24 and 26 which when selectively energized from a battery 28 determine the direction of rotation of the motor. In order to control the selective connecting of the field windings 24 and 26 to the battery 28, a relay 30 is provided, the relay having a movable contact member 32 connected to the battery 28, the movable contact member being disposed to engage one or the other of stationary contact members 34 and 36 connected to field windings 24 and 26, respectively.

Movement of the contact member 32 is controlled by a pair of opposed control windings 38 and 40 which are energized in accordance with the voltage of the dynamo-electric machine, the windings 38 and 40 being connected by a static circuit 42 through a transformer 44 to respond to changes in voltage of the dynamo-electric machine. The primary winding 46 of the transformer 44 is connected across two of the conductors supplied by the dynamo-electric machine whereby the secondary windings 48 and 50 of the transformer are energized in proportion to the voltage of the dynamo-electric machine.

The control winding 38 of the relay 30 is connected across secondary winding 48 of the transformer 44, one end of the control winding 38 being connected by conductor 52 to a terminal of the secondary winding 48, the other end of the control winding 38 being connected by conductor 54 through a linear reactor 56 to the other end of the secondary winding 48. Similarly, one terminal of the control winding 40 of the relay 30 is connected by a conductor 58 to a terminal of the secondary winding 50, the other terminal of the control winding 40 being connected by a conductor 54 through the linear reactor 56 to the other terminal of the secondary winding 50. Thus the secondary windings 38 and 40 are energized in proportion to changes in the voltage impressed on the transformer 44.

In order to increase the sensitivity of the relay 30 to such voltage changes, a ferro-resonant circuit consisting of a parallel connected saturable reactor 60 and a capacitor 62 is connected across conductors 52 and 54 and in series with the linear reactor 56. The capacitor 62 and the reactor 60 are selected to have volt-ampere characteristics as illustrated by curves 64 and 66, respectively, in Fig. 4, so that for some predetermined voltage of the dynamo-electric machine 10 they will resonate. That is, at the predetermined voltage selected as the voltage to be maintained substantially constant, the leading current of the capacitor 64 equals the lagging current drawn by the reactor 66, and the voltages across control coils 38 and 40 are balanced. As the voltage of the dynamo-electric machine varies from the predetermined voltage which is to be maintained, the parallel connected circuit draws a leading or a lagging current, as illustrated by curve 68 of Fig. 4, depending upon whether the voltage change is a decrease or an increase, respectively, from the predetermined magnitude which is to be maintained.

In operation, if the control circuit 42 is properly balanced with respect to the other elements of the circuit, the coils 38 and 40 are equally energized to maintain contact member 32 in a neutral position for a predetermined value of voltage across the primary winding 46 of the transformer 44. At the value represented in Fig. 4 by the horizontal line 70, the saturated reactor 60 and capacitor 62 are in resonance.

If the voltage which is to be regulated decreases from the predetermined magnitude, the current drawn through the reactor 56 by the parallel connected circuit 60 and 62 is a leading current which produces a voltage drop across the reactor 56 which is cooperative with the voltage drop across the parallel connected circuits 60 and 62 to tend to maintain the voltage across the coil 40 substantially constant. However, because of inherent losses in the circuit, the voltage will be slightly below the value across the coil at the resonant point for the reactor 60 and capacitor 62. At the same time the voltage across the coil 38 which is connected across the secondary winding 48 is decreased in proportion to the voltage change from the predetermined magnitude of the regulated alternating voltage. This decrease of voltage across the coil 38 is large in comparison with any decrease noted in the voltage across the coil 40. Since the coils 38 and 40 are in opposition, the resulting changes in the energization of the coils 40 and 38 effects a movement of the contact member 32 in a counterclockwise direction about the pivot of the relay 30 to engage the contact member 36.

The engagement of the contact members 32 and 36 establishes a circuit from the battery 28 through the contact members 32 and 36, the field winding 26 and armature 22 back to the battery 28 to so energize the motor as to drive the contact member 15 of the rheostat 16 to shunt additional sections of resistance from the field circuit of the dynamo-electric machine 10 and thereby increase the energization of the field winding 14 whereby the voltage across the machine is increased to the predetermined required magnitude.

If, on the other hand, the voltage change is an increase, the current drawn by the ferro-resonant circuit 60 and 62 through the reactor 56 is a lagging current which produces a voltage drop thereacross which cooperates with the voltage drop across the parallel connected circuit to effect a decrease in the resulting voltage across the coil 40 to tend to maintain the energization thereof substantially constant. At the same time, the voltage across the coil 38, which is connected across the secondary winding 48, is increased in proportion to the change in voltage on the transformer 44. Again, since the coils 38 and 40 are in opposition, the change in the energization thereof just described effects a movement of the contact member 32 to engage contact member 34 and thereby close the circuit extending from the battery 28 through contact members 32 and 34, field winding 24 and armature member 22 back to the battery 28 to effect an operation of the motor 20 in a direction to connect additional sections of the rheostat in circuit with the field winding 14. This operation effectively decreases the energization of the field winding 14 whereby the voltage output of the dynamo-electric machine 10 is decreased to the predetermined regulated value.

In the embodiment of this invention illustrated in Fig. 1, a relay 30 having a movable contact member 32 connected to the battery 28 and a single energizing coil 39 is utilized for controlling the connecting of the motor 20 to control its direction of operation. As in the previous embodiment, the coil 39 is energized in accordance with the change in voltage across the primary winding 46 of a transformer 44, the transformer 44 having a single secondary winding 49 across which the coil 39 is connected. Interposed between the coil 39 and the winding 49 is a control circuit comprising the ferro-resonant parallel connected circuit consisting of a saturable reactor 60 and a capacitor 62 and another linear reactor 57. The linear reactor 57 utilized in this embodiment is preferably an auto-transformer having a part 59, constituting the primary winding thereof, connected in series circuit with the parallel resonant circuit and across the secondary winding 49 of the transformer 44 and the whole or secondary winding 61 connected through the parallel resonant circuit across the coil 39. The remaining part of the energizing circuit for the dynamo-electric machine 10 embodies the same apparatus as the circuit of Fig. 2 and like numerals are employed for identifying like parts of the circuits.

As in the previous embodiment, if the voltage to be regulated decreases, the parallel resonant circuit draws a leading current through the primary winding 59 of the auto-transformer 57 to produce a voltage drop thereacross tending to oppose the change in the voltage to be regulated and to maintain the drop across the parallel resonant circuit substantially constant. However, since the winding 59 is part of the auto-transformer 57, it is apparent that the leading current drawn through the winding 59 cooperates to effect a change in the voltage drop across the secondary winding 61 of the auto-transformer to give a multiplied effect of the rate of change from the predetermined magnitude of voltage.

This is evident for the leading current through the primary winding of the transformer 57 induces a voltage therein that is a measure of the change in voltage from the regulated magnitude. The remaining portion of the transformer or reactor 57 functions to magnify this variable component of the voltage insofar as its effect on the coil 39 is concerned. The resulting voltage across the coil 39 is thus a combination of the voltage resulting from the voltage changes to be regulated and the magnified variable component of the voltage, with the result that the voltage across the coil 39 is greatly decreased for slight decreases in the voltage changes to be regulated.

Referring to Fig. 3, curve 72 is illustrative of the change in voltage across the coil 39 as the voltage of the circuit changes to be regulated represented by the curve 74 is changed. As is evident, for slight changes of the circuit voltage from a predetermined value, a very large change in the voltage drop across the coil 39 is obtained.

Upon the occurrence of the magnified decrease in the voltage across the winding 39, the contact member 32 is actuated to engage contact member 36 to so energize the winding 26 of the motor 20 as to effect operation of the motor 20 to actuate the contact member 15 of the rheostat 16 to shunt additional sections of the rheostat, and thereby increase the energization of the field winding 14 to effect an increase in the voltage output of the dynamo-electric machine.

If, on the other hand, the voltage of the dynamo-electric machine should increase, then the parallel resonant circuit 60 and 62 functions to draw a lagging current through the winding 59 of the saturable reactor or auto-transformer 57 to produce a voltage drop thereacross which tends to maintain the voltage across the parallel connected circuit substantially constant. As in the previous case, the lagging current drawn through the winging 59 induces a voltage therein that is a measure of the change of the voltage from the regulated magnitude. The other portion of the saturable reactor 57 acts to magnify this variable component of the voltage with the result that the resulting voltage across the coil 39 is a combination of the voltage resulting from the voltage which is to be regulated and the magnified variable component of the voltage to effect a magnified or large increase in the energization of the coil 39 for a slight increase in the voltage across the primary winding 46 of the transformer 44.

Such an increase in the energization of the coil 39 actuates the contact member 32 into engagement with the contact member 34 to close the circuit to so energize the motor 20 as to effect an operation thereof to connect additional sections of the rheostat 16 in circuit with the field winding 14 of the machine 10 and thereby effecting decrease in the voltage output of the machine 10 to the predetermined regulated value.

The static circuit utilized in the voltage regulating system of this invention provides a very sensitive regulating system, in that small changes in applied voltage effect sufficient change of energy in the relay circuit 39 to provide travel and pressure of the contacts to control a small reversing motor for effecting the regulating operation without interposing intermediate relays.

While this invention has been described with reference to particular embodiments thereof, it is, of course, not to be limited thereto except insofar as is necessitated by the scope of the appended claims.

I claim as my invention:

1. In a regulating system for an alternating voltage, in combination, apparatus for controlling the magnitude of the alternating voltage, means disposed to be energized for controlling the apparatus, a transformer connected to provide a control voltage which is proportional to the alternating voltage, and a control circuit connected between the transformer and the control means for the apparatus, the control circuit including a parallel connected circuit consisting of a saturable reactor and a capacitor connected across the transformer to be supplied thereby, and a linear reactor connected in series between the parallel connected circuit and the transformer.

2. In a regulating system for an alternating voltage, in combination, apparatus for controlling the magnitude of the alternating voltage, means disposed to be energized for controlling the apparatus, a transformer connected to provide a control voltage which is proportional to the alternating voltage, and a control circuit connected between the transformer and the control means for the apparatus, the control circuit including a parallel connected circuit consisting of a saturable reactor and a capacitor connected across the transformer to be supplied thereby, and a linear reactor connected in series between the parallel connected circuit and the transformer, the saturable reactor and capacitor of the parallel connected circuit being in resonance at a predetermined regulated magnitude of the alternating voltage and being disposed to draw a leading or lagging current through the series connected linear reactor depending upon the variation in the alternating current from the predetermined magnitude thereof whereby the voltage across the parallel connected circuit is a measure of the amount of change from the regulated magnitude of the alternating current.

3. In a regulator for an alternating voltage, in combination, apparatus for controlling the magnitude of the alternating voltage, a pair of opposed control coils for cotrolling the apparatus, means for providing a control voltage which is proportional to the alternating voltage, one of the control coils being connected to the control voltage means to be energized in direct porportion to the alternating voltage, and a control circuit connected between the other control coil and the control voltage means to control the energization of the coil, the control circuit including a parallel connected circuit consisting of a saturable reactor and a capacitor connected across the control voltage means, and a linear reactor connected in series between the parallel connected circuit and the control voltage means, the reactor and capacitor of the parallel circuit being selected to resonate at a predetermined value of the alternating current.

4. In a regulator for an alternating voltage, in combination, apparatus for controlling the magnitude of the alternating voltage, a coil disposed to be energized for controlling the apparatus, means for providing a control voltage which is proportional to the alternating voltage, and a control circuit connected between the coil and the control voltage means for controlling the energization of the coil, the control circuit including a parallel connected circuit consisting of a saturable reactor and a capacitor connected across the control voltage means, and a linear reactor, a part of the last said reactor being connected in series between the parallel circuit and the control means, another part of the last said reactor being connected in series between the coil and the control voltage means, the saturable reactor and capacitor of the parallel connected circuit being in resonance at a predetermined regulated magnitude of the alternating voltage and being disposed to draw a leading or lagging current through the part of the reactor connected in series therewith depending upon the variation in the alternating voltage from the predetermined magnitude thereof whereby the voltage drop across the parallel connected circuit is a measure of the amount of change of the alternating voltage from the predetermined magnitude, the current drawn through the part of the reactor connected in series with the parallel circuit inducing a voltage in the series connected reactor, the induced voltage in the series connected reactor cooperating with the voltage drop across the parallel circuit to control the energization of the coil whereby the energization is a multiplied effect of the amount of change of the alternating voltage from the predetermined magnitude.

LESTER G. TUBBS.